United States Patent
Willmott et al.

(10) Patent No.: US 10,969,135 B2
(45) Date of Patent: Apr. 6, 2021

(54) CENTRAL PLANT CONTROL SYSTEM WITH COMPUTATION REDUCTION BASED ON SENSITIVITY ANALYSIS

(71) Applicant: Johnson Controls Technology Company, Auburn Hills, MI (US)

(72) Inventors: Graeme Willmott, West Milwaukee, WI (US); Matthew J. Asmus, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 84 days.

(21) Appl. No.: 16/046,953

(22) Filed: Jul. 26, 2018

(65) Prior Publication Data
US 2019/0032949 A1 Jan. 31, 2019

Related U.S. Application Data

(60) Provisional application No. 62/537,811, filed on Jul. 27, 2017.

(51) Int. Cl.
*G05B 15/02* (2006.01)
*F24F 11/65* (2018.01)
(Continued)

(52) U.S. Cl.
CPC ............ *F24F 11/65* (2018.01); *G05B 13/041* (2013.01); *G05B 15/02* (2013.01); *F24F 2110/10* (2018.01); *G05B 2219/2642* (2013.01)

(58) Field of Classification Search
CPC ..... F24F 11/65; F24F 2110/10; G05B 13/041; G05B 15/02; G05B 2219/2642
See application file for complete search history.

(56) References Cited

U.S. PATENT DOCUMENTS

| | | | |
|---|---|---|---|
| 8,903,554 B2 | 12/2014 | Stagner | |
| 2001/0020644 A1* | 9/2001 | Gauthier | G05D 23/1919 236/11 |

(Continued)

FOREIGN PATENT DOCUMENTS

EP 3553400 A1 * 10/2019 .............. F24F 11/65

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

(Continued)

*Primary Examiner* — Jennifer L Norton
(74) *Attorney, Agent, or Firm* — Foley & Lardner LLP

(57) ABSTRACT

Disclosed herein are related to a system, a method, and a non-transitory computer readable storing instructions for operating an energy plant comprised of heating, ventilation and air conditioning (HVAC) devices. In one aspect, the system generates gradient data indicating a gradient of operating performance of the energy plant with respect to values of a plurality of control variables of HVAC devices. The system determines, from the plurality of control variables, a reduced group of control variables of the HVAC devices based on the gradient data. The system determines a set of values of the reduced group of control variables. The system operates the energy plant according to the determined set of values of the reduced group of control variables.

20 Claims, 10 Drawing Sheets

(51) Int. Cl.
  *G05B 13/04* (2006.01)
  *F24F 110/10* (2018.01)

(56) References Cited

U.S. PATENT DOCUMENTS

| | | | | |
|---|---|---|---|---|
| 2010/0106331 | A1* | 4/2010 | Li | G05B 5/01 |
| | | | | 700/277 |
| 2015/0127121 | A1* | 5/2015 | Luedtke | G06Q 10/0639 |
| | | | | 700/19 |
| 2015/0316902 | A1 | 11/2015 | Wenzel | |
| 2015/0316903 | A1 | 11/2015 | Asmus et al. | |
| 2016/0231013 | A1* | 8/2016 | Kates | F24F 11/0001 |
| 2016/0346313 | A1* | 12/2016 | Taylor Nordg Rd | |
| | | | | A61K 31/715 |
| 2017/0045253 | A1* | 2/2017 | Dempsey | F24F 11/30 |
| 2018/0267515 | A1* | 9/2018 | House | G05B 19/4188 |
| 2019/0024928 | A1* | 1/2019 | Li | F24F 11/61 |
| 2020/0064004 | A1* | 2/2020 | Salsbury | F24F 11/65 |
| 2020/0224909 | A1* | 7/2020 | Przybylski | F24F 11/64 |
| 2020/0233657 | A1* | 7/2020 | Duraisingh | H04L 67/34 |

OTHER PUBLICATIONS

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identitication, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609. 05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

\* cited by examiner

CENTRAL PLANT CONTROL SYSTEM WITH COMPUTATION REDUCTION BASED ON SENSITIVITY ANALYSIS

CROSS-REFERENCE TO RELATED PATENT APPLICATIONS

This application claims the benefit of U.S. Provisional Patent Application No. 62/537,811, filed Jul. 27, 2017, which is incorporated herein by reference in its entirety.

BACKGROUND

The present disclosure relates generally to the operation of a central plant for serving building thermal energy loads. The present disclosure relates more particularly to systems and methods for optimizing the operation of one or more subplants of a central plant.

A heating, ventilation and air conditioning (HVAC) system (also referred to as "a central plant" or "an energy plant" herein) may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. Some central plants include thermal energy storage configured to store the thermal energy produced by the central plant for later use.

A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

Controlling the central plant includes determining a set of operating parameters of the HVAC devices. In particular, some HVAC device operates according to a selected operating parameter from a range of operating parameters. Examples of the operating parameters include a particular value of operating capacity (e.g., 50% capacity) of corresponding HVAC devices. Determining a set of operating parameters includes, for a candidate set of operating parameters, predicting thermodynamic states (e.g., pressure values, temperatures values, mass flow values, etc.) of different HVAC devices in operation together, and predicting power consumption of the central plant based on the predicted thermodynamic states. By comparing power consumptions of different candidate sets of operating parameters, a candidate set with the lowest power consumption may be determined as the set of operating parameters.

One conventional approach of predicting thermodynamic states of a central plant for a candidate set of operating parameters includes computing the full thermodynamic states by a non-linear solver. However, predicting thermodynamic states of the central plant in a complex arrangement by the non-linear solver is inefficient in terms of computational resources (e.g., processor usage and memory used). Furthermore, predicting thermodynamic states for multiple sets of operating parameters, and comparing power consumptions for multiple sets of operating parameters to determine a set of thermodynamic states rendering lower power consumption through a conventional approach are inefficient and computationally exhaustive.

SUMMARY

Various embodiments disclosed herein are related to a controller for an energy plant having heating, ventilation, or air conditioning (HVAC) devices. The controller includes a processing circuit comprising a processor and memory storing instructions executed by the processor. The processing circuit is configured to generate gradient data indicating a gradient of operating performance of the energy plant with respect to values of a plurality of control variables of the HVAC devices. The processing circuit is configured to determine, from the plurality of control variables, a reduced group of control variables of the HVAC devices based on the gradient data. The processing circuit is configured to determine a set of values of the reduced group of control variables. The processing circuit is configured to operate the HVAC devices of the energy plant according to the determined set of values of the reduced group of control variables.

In one or more embodiments, the control variables include at least a capacity, temperature, or pressure of one or more of the HVAC devices.

In one or more embodiments, the processing circuit is configured to determine the set of values of the reduced group of control variables by determining a range of values of a control variable, to which the operating performance of the energy plant is insensitive, and excluding the control variable from the plurality of control variables to obtain the reduced group of control variables.

In one or more embodiments, the processing circuit is configured to operate the energy plant according to a predetermined value of the excluded control variable.

In one or more embodiments, the processing circuit is configured to determine a local minimum of the operating performance of the energy plant. The processing circuit may determine a range of values of the operating performance of the energy plant. The range of values of the operating performance may be within a predetermined amount from the local minimum. The processing circuit may determine the range of values of the control variable corresponding to the range of values of the operating performance.

In one or more embodiments, the processing circuit is configured to determine the range of values of the control variable rendering the gradient below a threshold.

In one or more embodiments, the processing circuit is configured to determine the set of values of the reduced group of control variables by predicting states of the HVAC devices using a non-linear optimizer.

In one or more embodiments, the processing circuit is configured to determine the set of values of the reduced group of control variables by excluding one or more control variables to which the operating performance of the energy plant is insensitive from predicting the states of the HVAC devices using the non-linear optimizer.

In one or more embodiments, the processing circuit is configured to generate the gradient data in response to detecting a change in a topology of the HVAC devices.

Various embodiments disclosed herein are related to a method of operating an energy plant having heating, ventilation, or air conditioning (HVAC) devices. The method includes generating gradient data indicating a gradient of operating performance of the energy plant with respect to values of a plurality of control variables of the HVAC devices. The method includes determining, from the plurality of control variables, a reduced group of control variables of the HVAC devices based on the gradient data. The method includes determining a set of values of the reduced group of control variables. The method includes operating the HVAC devices of the energy plant according to the determined set of values of the reduced group of control variables.

In one or more embodiments, the control variables include at least a capacity, temperature, or pressure of one or more of the HVAC devices.

In one or more embodiments, determining the set of values of the reduced group of control variables includes determining a range of values of a control variable, to which the operating performance of the energy plant is insensitive, and excluding the control variable from the plurality of control variables to obtain the reduced group of control variables.

In one or more embodiments, the method further includes operating the energy plant according to a predetermined value of the excluded control variable.

In one or more embodiments, the method further includes determining a local minimum of the operating performance of the energy plant. The method may further include determining a range of values of the operating performance of the energy plant. The range of values of the operating performance may be within a predetermined amount from the local minimum. The method may further include determining the range of values of the control variable corresponding to the range of values of the operating performance.

In one or more embodiments, the method further includes determining the range of values of the control variable rendering the gradient below a threshold.

In one or more embodiments, the method further includes predicting states of the HVAC devices using a non-linear optimizer.

In one or more embodiments, the method further includes excluding one or more control variables, to which the operating performance of the energy plant is insensitive from predicting the states of the HVAC devices using the non-linear optimizer.

In one or more embodiments, the method further generating the gradient data in response to detecting a change in a topology of the HVAC devices.

Various embodiments disclosed herein are related to a non-transitory computer readable medium comprising instructions when executed by a processor cause the processor to detect a change in a topology of a plurality of heat, ventilation, or air conditioning (HVAC) devices of an energy plant, determine, from a plurality of control variables of the plurality of HVAC devices, a reduced group of control variables of the plurality of HVAC devices, in response to detecting the change in the topology of the plurality of HVAC devices, determine a set of values of the reduced group of control variables, and operate the plurality of HVAC devices the energy plant according to the determined set of values of the reduced group of control variables.

In one or more embodiments, the instructions when executed by the processor further cause the processor to generate gradient data indicating a gradient of operating performance of the energy plant with respect to values of the plurality of HVAC devices, in response to detecting the change in the topology of the plurality of HVAC devices. The reduced group of control variables may be determined based on the gradient data.

DETAILED DESCRIPTION

Overview

Figure 1:
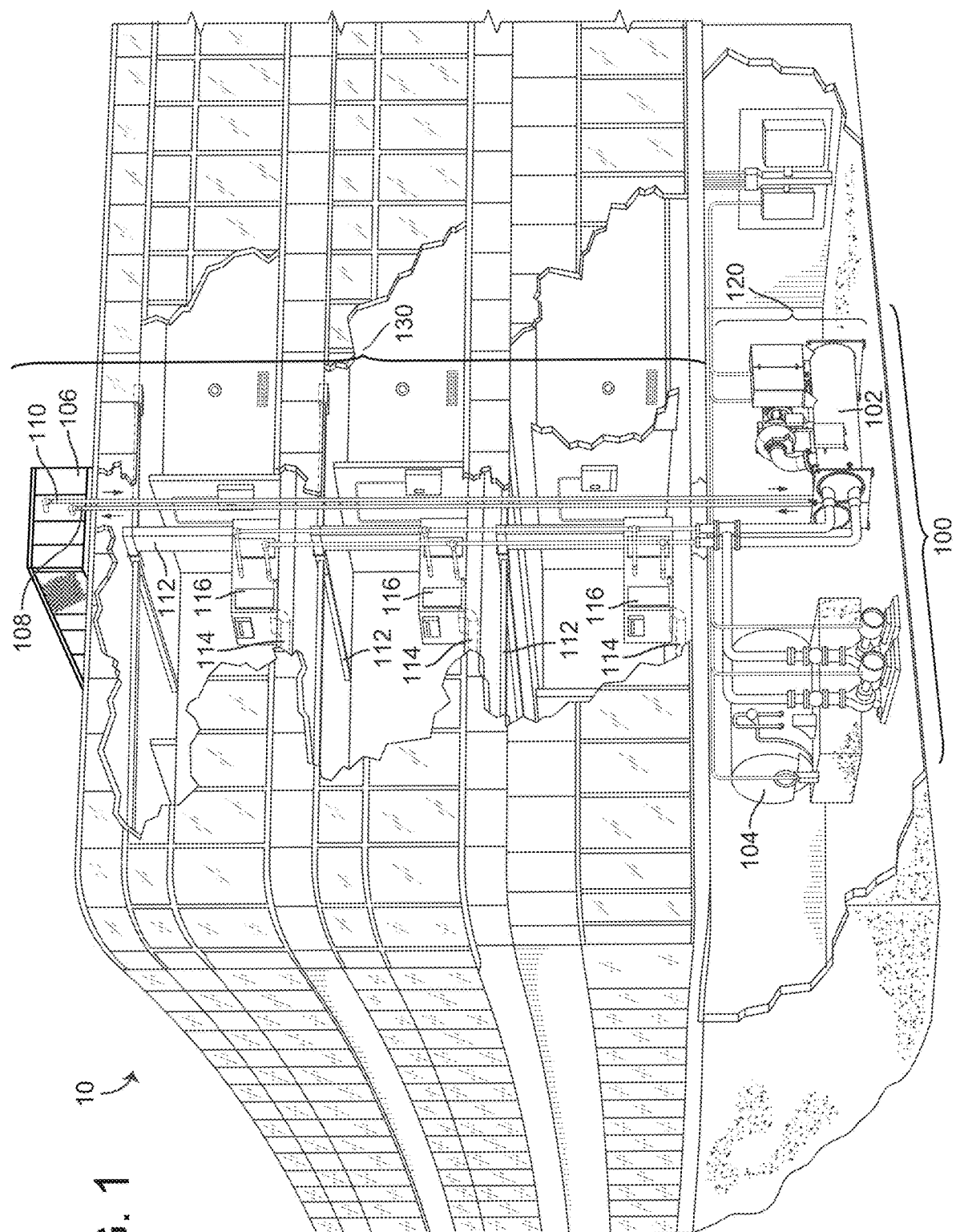
FIG. 1 is a drawing of a building equipped with an HVAC system, according to some embodiments.

Referring generally to the FIGURES, disclosed herein are systems and methods for determining a set of operating parameters for operating the HVAC system through disclosed computation reduction based on sensitivity analysis.

In some embodiments, a central plant controller disclosed herein determines sensitivity of different control variables on a predicted performance of the HVAC system, and identifies, from the control variables, a reduced group of the control variables to determine operating parameters of the control variables rendering improved performance of the HVAC system. An operating parameter is also referred to as a value or a set point of a control variable (e.g., 50% of capacity, temperature value, pressure value, etc.). In some embodiments, the performance of the HVAC system includes, but is not limited to, a predicted power consumption, an operating speed, amount of energy consumed, cost, or any combination of them of the HVAC system operating according to operating parameters.

In one approach, the central plant controller generates gradient data indicating gradient of the performance of the central plant with respect to the control variables. In addition, the central plant controller may identify the reduced group of the control variables with gradients above a predetermined threshold and a remaining group of the control variables with gradients below the predetermined threshold. Effect of the remaining group of the control variables on the performance of the central plant may be insignificant. Hence, the central plant controller may isolate or omit computation of operating states of HVAC devices of the HVAC system associated with the remaining group of control variables, when predicting performance of the HVAC system. Accordingly, the central plant controller may compare predicted performances of the HVAC system operating according to different sets of values of the reduced group of the control variables, and determine a set of values of the control variables rendering an improved performance of the HVAC system based on the predicted performances. Moreover, the central plant controller may operate the HVAC system according to the determined set of values of the control variables.

Beneficially, the central plant controller improves an operation efficiency of the HVAC system by reducing computation resource for determining operating parameters of the HVAC system through sensitivity analysis disclosed herein. The central plant controller may predict operating states of the HVAC system operating according to corresponding sets of the reduced group of the operating parameters, irrespective of HVAC devices of the HVAC system associated with a group of operating parameters insensitive to the performance of the HVAC system. As a result, the HVAC system may omit or isolate predicting operating states of the HVAC devices of the HVAC system insensitive to the performance of the HVAC system. Consequently, the central plant controller may identify a set of the operating parameters rendering an improved performance of the HVAC system in a computationally efficient manner.

Building and HVAC System

Figure 2:
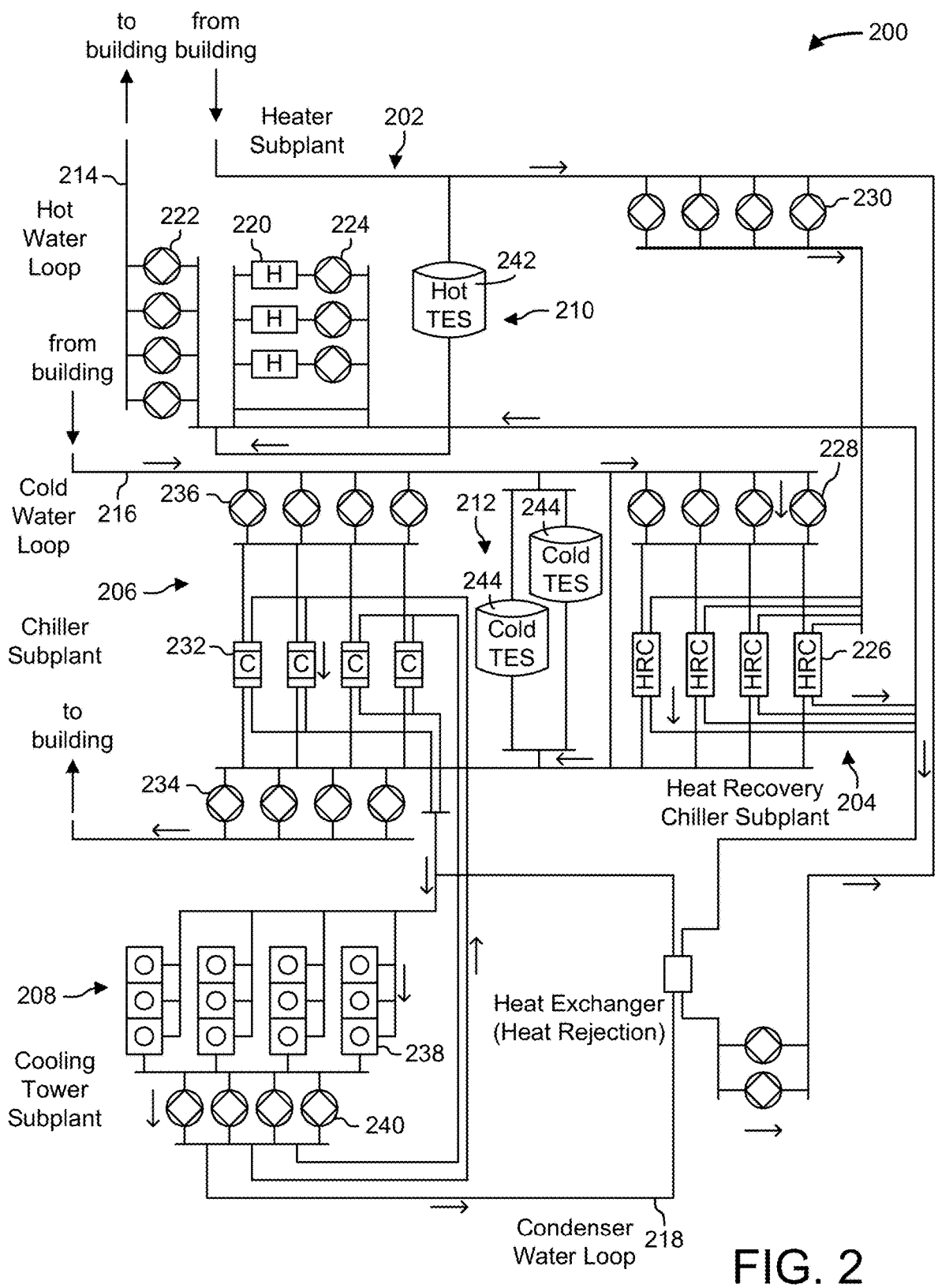
FIG. 2 is a schematic of a waterside system, which can be used as part of the HVAC system of FIG. 1, according to some embodiments.
Figure 3:
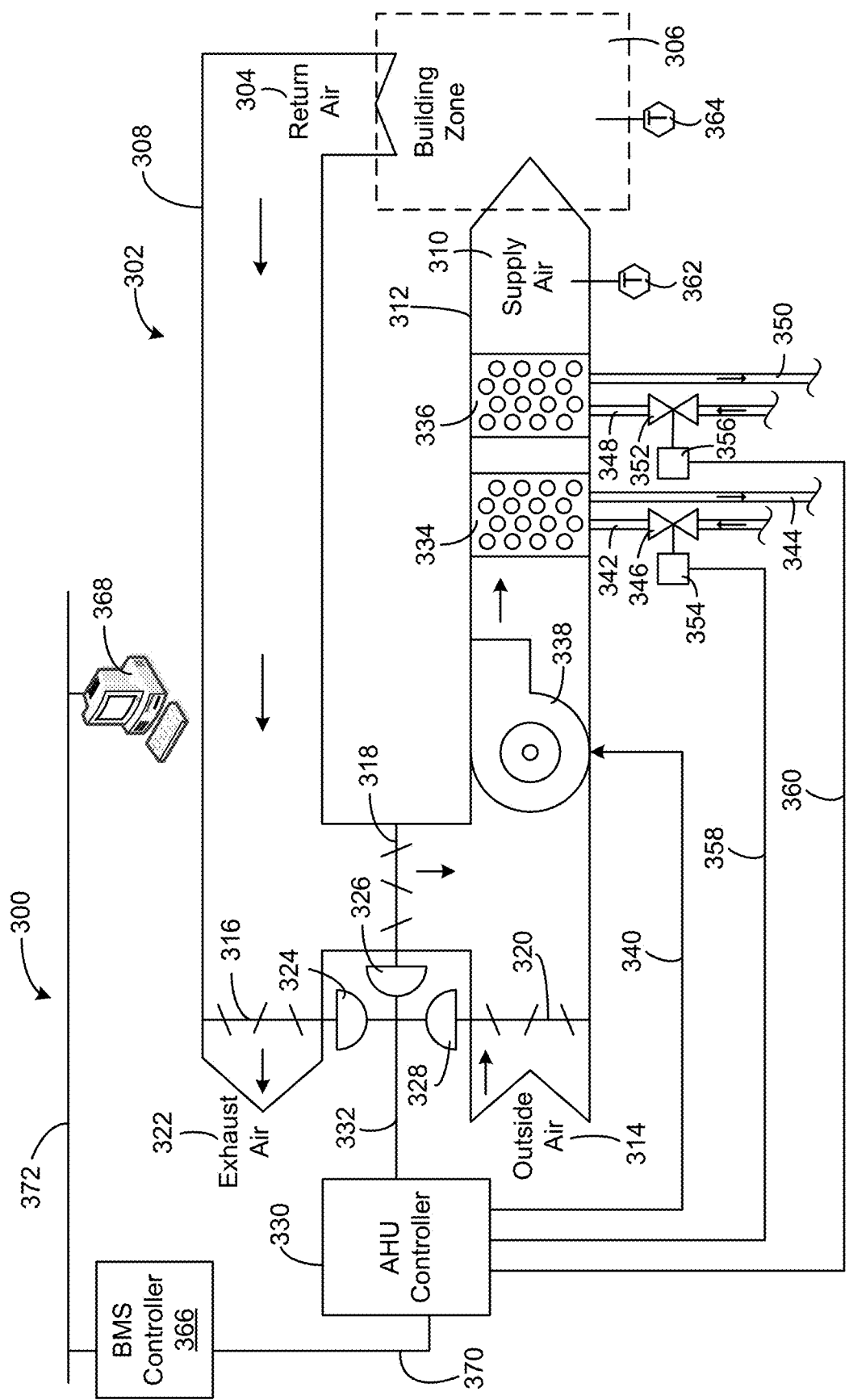
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
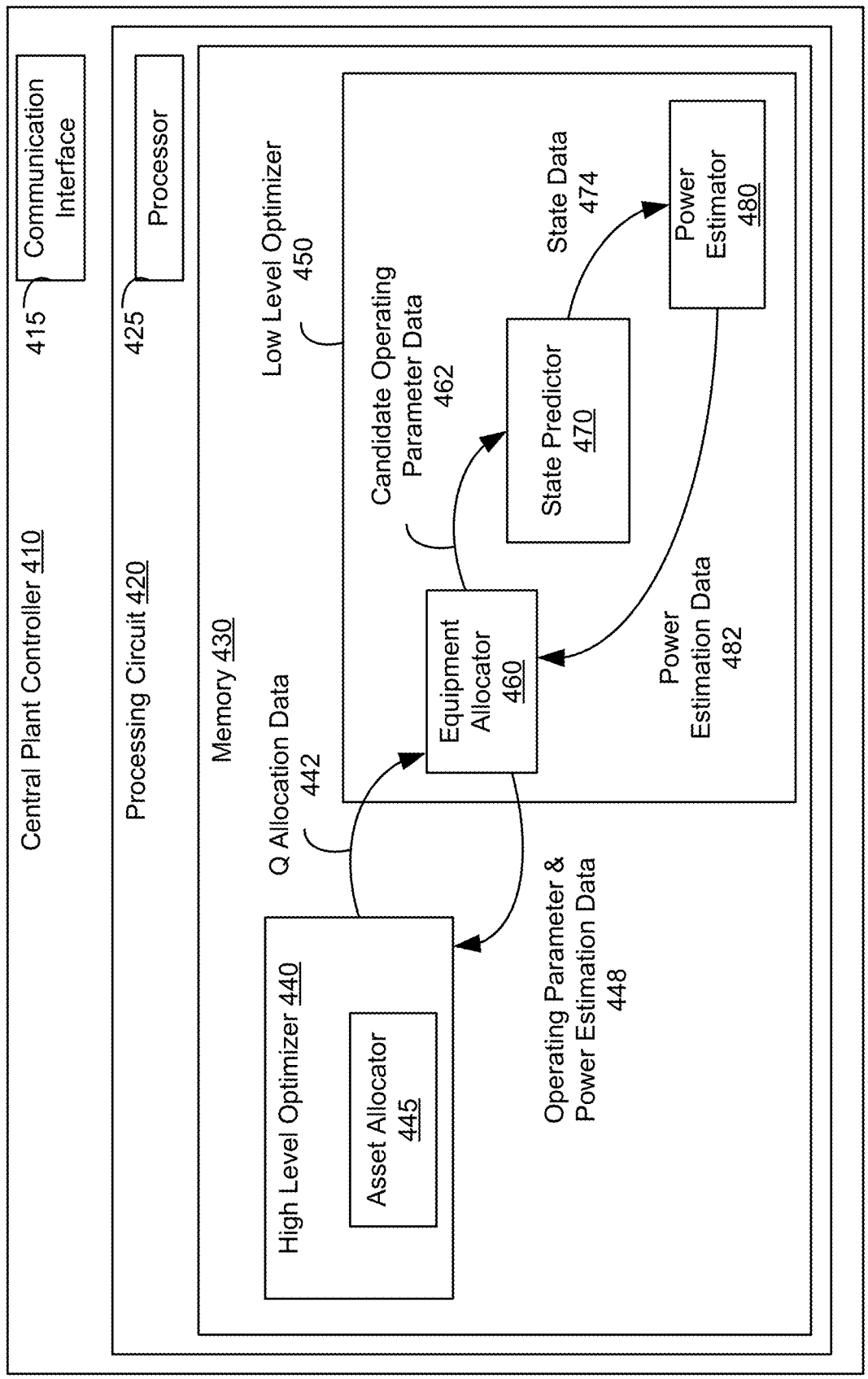
FIG. 4 is a block diagram of a central plant controller, according to some embodiments.

Referring to FIG. 4, illustrated is a block diagram of a central plant controller 410, according to some embodiments. In some embodiments, the central plant controller 410 is part of the HVAC system 100 of FIG. 1. Alternatively, the central plant controller 410 is coupled to the HVAC system 100 through a communication link. The central plant controller 410 may be the AHU controller 330 of FIG. 3, or a combination of the BMS controller 366 and the AHU controller 330 of FIG. 3. In one configuration, the central plant controller 410 includes a communication interface 415, and a processing circuit 420. These components operate together to determine a set of operating parameters for operating various HVAC devices of the HVAC system 100. In some embodiments, the central plant controller 410 includes additional, fewer, or different components than shown in FIG. 4.

The communication interface 415 facilitates communication of the central plant controller 410 with other HVAC devices (e.g., heaters, chillers, air handling units, pumps, fans, thermal energy storage, etc.). The communication interface 415 can be or include wired or wireless communications interfaces (e.g., jacks, antennas, transmitters, receivers, transceivers, wire terminals, etc.). In various embodiments, communications via the communication interface 415 can be direct (e.g., local wired or wireless communications) or via a communications network (e.g., a WAN, the Internet, a cellular network, etc.). For example, the communication interface 415 can include an Ethernet/USB/RS232/RS485 card and port for sending and receiving data through a network. In another example, the communication interface 415 can include a Wi-Fi transceiver for communicating via a wireless communications network. In another example, the communication interface 415 can include cellular or mobile phone communication transceivers.

The processing circuit 420 is a hardware circuit executing instructions to determine a set of parameters for operating HVAC devices of the HVAC system 100. In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including a high level optimizer 440, and a low level optimizer 450. The high level optimizer 440 may determine how to distribute thermal energy loads across HVAC devices (e.g., subplants, chillers, heaters, valves, etc.) for each time step in the prediction window, for example, to minimize the cost of energy consumed by the HVAC devices. The low level optimizer 450 may determine how to operate each subplant according to the thermal energy loads determined by the high level optimizer 440. In other embodiments, the processor 425 and the memory 430 may be omitted, and the high level optimizer 440 and the low level optimizer 450 may be implemented as hardware modules by a reconfigurable circuit (e.g., field programmable gate array (FPGA)), an application specific integrated circuit (ASIC), or any circuitries, or a combination of software modules and hardware modules.

In one implementation, the high level optimizer 440 determines thermal energy loads of HVAC devices of the HVAC system 100, and generates Q allocation data 442 indicating the determined thermal energy loads. The high level optimizer 440 may provide the Q allocation data 442 to the low level optimizer 450. In return, the high level optimizer 440 may receive, from the low level optimizer 450, operating parameter and power estimation data 448 indicating a set of operating parameters to operate HVAC devices of the HVAC system 100, predicted power consumptions when operating the HVAC system 100 according to the set of operating parameters, or both. Based on the operating parameter and power estimation data 448, the high level optimizer 440 can operate the HVAC system 100 accordingly or generate different Q allocation data 442 for further optimization. The high level optimizer 440 and the low level optimizer 450 may operate together online in real time, or offline at different times.

In one or more embodiments, the high level optimizer 440 includes an asset allocator 445 that determines a distribution of thermal energy loads of the HVAC devices of the HVAC system 100 based on a predicted thermal energy load of the HVAC system 100. In some embodiments, the asset allocator 445 determines the optimal load distribution by minimizing the total operating cost of HVAC system 100 over the prediction time window. In one aspect, given a predicted thermal energy load $\hat{l}_k$ and utility rate information received through a user input or automatically determined by a scheduler (not shown), the asset allocator 445 may determine a distribution of the predicted thermal energy load $\hat{l}_k$ across subplants to minimize the cost. The asset allocator 445 generates the Q allocation data 442 indicating the predicted loads $\hat{l}_k$ of different HVAC devices of the HVAC system 100 and provides the Q allocation data 442 to the low level optimizer 450.

In some embodiments, distributing thermal energy load includes causing TES subplants to store thermal energy during a first time step for use during a later time step. Thermal energy storage may advantageously allow thermal energy to be produced and stored during a first time period when energy prices are relatively low and subsequently retrieved and used during a second time period when energy prices are relatively high. The high level optimization may be different from the low level optimization in that the high level optimization has a longer time constant due to the thermal energy storage provided by TES subplants. The high level optimization may be described by the following equation:

$$\theta_{HL}^* = \mathrm{argmin}_{\theta_{HL}} J_{HL}(\theta_{HL}) \qquad \text{Eq. (1)}$$

where $\theta_{HL}^*$ contains the optimal high level decisions (e.g., the optimal load $\dot{Q}$ for each of subplants) for the entire prediction period and $J_{HL}$ is the high level cost function.

To find the optimal high level decisions $\theta_{HL}^*$, the asset allocator 445 may minimize the high level cost function $J_{HL}$. The high level cost function $J_{HL}$ may be the sum of the economic costs of each utility consumed by each of subplants for the duration of the prediction time period. For example, the high level cost function $J_{HL}$ may be described using the following equation:

$$J_{HL}(\theta_{HL}) = \sum_{k=1}^{n_h} \sum_{i=1}^{n_s} [\sum_{j=1}^{n_u} t_s \cdot c_{jk} u_{jik}(\theta_{HL})] \qquad \text{Eq. (2)}$$

where $n_h$ is the number of time steps k in the prediction time period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \max_{n_h}(u_{elec}(\theta_{HL}), u_{max,ele}) \qquad \text{Eq. (3)}$$

where $w_d$ is a weighting term, $c_{demand}$ is the demand cost, and the max( ) term selects the peak electricity use during the applicable demand charge period.

In some embodiments, the high level optimization performed by the high level optimizer 440 is the same or similar to the high level optimization process described in U.S. patent application Ser. No. 14/634,609 filed Feb. 27, 2015 and titled "High Level Central Plant Optimization," which is incorporated by reference herein.

The low level optimizer 450 receives the Q allocation data 442 from the high level optimizer 440, and determines operating parameters (e.g., values of capacities) of the HVAC devices of the HVAC system 100. In one or more embodiments, the low level optimizer 450 includes an equipment allocator 460, a state predictor 470, and a power estimator 480. Together, these components operate to determine a set of operating parameters, for example, rendering reduced power consumption of the HVAC system 100 for a given set of thermal energy loads indicated by the Q allocation data 442, and generate operating parameter data indicating the determined set of operating parameters. Particularly, the low level optimizer 450 determines the set of operating parameters based on sensitivity of the operating parameters on a performance of the HVAC system 100. In some embodiments, the low level optimizer 450 includes different, more, or fewer components, or includes components in different arrangements than shown in FIG. 4.

In one configuration, the equipment allocator 460 receives the Q allocation data 442 from the high level optimizer 440, and generates candidate operating parameter data 462 indicating a set of candidate operating parameters of HVAC devices of the HVAC system 100. The state predictor 470 receives the candidate operating parameter data 462 and predicts thermodynamic states of the HVAC system 100 at various locations for the set of candidate operating parameters. The state predictor 470 generates state data 474 indicating the predicted thermodynamic states, and provides the state data 474 to the power estimator 480. The power estimator 480 predicts, based on the state data 474, total power consumed by the HVAC system 100 operating according to the set of candidate operating parameters, and generates the power estimation data 482 indicating the predicted power consumption. The equipment allocator 460 may repeat the process with different sets of candidate operating parameters to obtain predicted power consumptions of the HVAC system 100 operating according to different sets of candidate operating parameters, and select a set of operating parameters rendering lower power consumption. The equipment allocator 460 may generate the operating parameter and power estimation data 448 indicating (i) the selected set of operating parameters and (ii) predicted power consumption of the power plant when operating according to the selected set of operating parameters, and provide the operating parameter and power estimation data 448 to the high level optimizer 440.

The equipment allocator 460 is a component that interfaces with the high level optimizer 440. In one aspect, the equipment allocator 460 receives the Q allocation data, and determines a candidate set of operating parameters of HVAC devices of the HVAC system 100. For example, the equipment allocator 460 determines that a first chiller is assigned to operate with a first range of thermal energy load and a second chiller is assigned to operate with a second range of thermal energy load based on the Q allocation data. In this example, the equipment allocator 460 may determine that operating parameters (e.g., between 30% to 50% capacity) of the first chiller can achieve the first range of thermal energy load and operating parameters (e.g., between 60~65% capacity) of the second chiller can achieve the second range of thermal energy load. From different combinations of operating parameters of the first chiller and the second chiller, the equipment allocator 460 selects a candidate set of operating parameters (e.g., 45% capacity of the first chiller and 60% capacity of the second chiller). Additionally, the equipment allocator 460 generates the candidate operating parameter data 462 indicating the selected candidate set of operating parameters, and provides the candidate operating parameter data 462 to the state predictor 470.

The state predictor 470 predicts an operating condition of the HVAC system 100 based on a set of operating parameters of the HVAC system 100 as indicated by the candidate operating parameter data 462. The operating condition of the HVAC system 100 includes thermodynamic states at various locations of the HVAC system 100. Examples of thermodynamic states include input pressure value, output pressure value, input mass flow value, output mass flow value, input enthalpy value, output enthalpy value, etc. In one approach, predicting thermodynamic states of the HVAC system 100 includes applying the set of operating parameters to a linear solver and a non-linear solver. Generally, the non-linear solver consumes a large amount of resources (e.g., processor threads and storage capacity) to obtain a solution. In one or more embodiments, the state predictor 470 reduces a number of unknown thermodynamic states to be predicted based on schematic arrangements of HVAC devices of the HVAC system 100, and may further reduce the number of unknown thermodynamic states to be predicted by propagating known thermodynamic states based on the operating parameters by performing sensitivity analysis and reducing values of control variables to be determined, as described in detail below with respect to FIGS. 5 through 10. Advantageously, a fewer number of unknown thermodynamic states can be determined by the non-linear solver, thereby improving efficiency of predicting the thermodynamic states for the set of operating parameters. The state predictor 470 generates state data 474 indicating the predicted thermodynamic states for the candidate set of operating parameters, and provides the state data 474 to the power estimator 480.

The power estimator 480 predicts power consumed by the HVAC system 100 based on the state data 474. In one approach, the power estimator 480 determines, for each HVAC device, a predicted power consumption based on thermodynamic states (e.g., pressure values, mass flow values, enthalpy values, etc.) and an operating parameter (e.g., capacity) of the HVAC device. In addition, the power estimator 480 may add power consumptions of the HVAC devices of the HVAC system 100 to obtain a total power consumption of the HVAC system 100. The power estimator 480 generates the power estimation data 482 indicating the total power consumption of the HVAC system 100, power consumption of each HVAC device, or any combination of them, and provides the power estimation data 482 to the equipment allocator 460.

In some embodiments, the equipment allocator 460 compares predicted power consumptions of the HVAC system 100 for multiple sets of operating parameters, and selects a set of operating parameters for operating the HVAC system 100. In one approach, the equipment allocator 460 selects, from the multiple sets of operating parameters, the set of operating parameters rendering the lowest power consumption. Hence, the HVAC system 100 operating based on the set of operating parameters determined by the equipment allocator 460 benefits from reduced power consumption. The equipment allocator 460 may generate the operating parameter and power estimation data 448 indicating the set of operating parameters to operate HVAC devices of the HVAC system 100, predicted power consumptions when operating the HVAC system 100 according to the set of operating parameters, or any combination of them, and provide the operating parameter and power estimation data 448 to the high level optimizer 440.

In some embodiments, the equipment allocator 460 performs sensitivity analysis to identify a reduced group of control variables of HVAC devices for determining a set of values of the control variables rendering an improved performance (e.g., lower power consumption) of the HVAC system. The sensitivity analysis herein refers to determining sensitivity of different control variables of the HVAC devices on the performance of the HVAC devices. Based on the sensitivity analysis, the equipment allocator 460 may determine that values of a reduced group of control variables in a first range (e.g., a chiller capacity between 0~40%, and a condenser exit temperature between 90~100 F) may be sensitive to the performance of the HVAC system. The equipment allocator 460 may also determine that values of a reduced group of control variables in a second range (e.g., a chiller capacity between 40~60%, and a condenser exit temperature between 50~70 F) may be insensitive to the performance of the HVAC system. For another example, the equipment allocator 460 may also determine that different control variables (e.g., separate control loop) may be insensitive to the performance of the HVAC system. The equipment allocator 460 may generate different candidate operating parameter data 462 indicating different sets of values of the reduced group of control variables sensitive to the performance of the HVAC system, without values of other control variables insensitive to the performance of the HVAC system. The equipment allocator 460 may also cause or instruct the state predictor 470 to predict operating states of components of the HVAC system according to values of the reduced group of the control variables irrespective of values of other control variables of the HVAC system. Thus, the group of control variables of the HVAC system insensitive to the operating performance may be excluded from predicting the operating states of the components of the HVAC system. Hence, the state predictor 470 may perform computation for a fewer number of unknowns, thereby improving computation efficiency.

Figure 5:
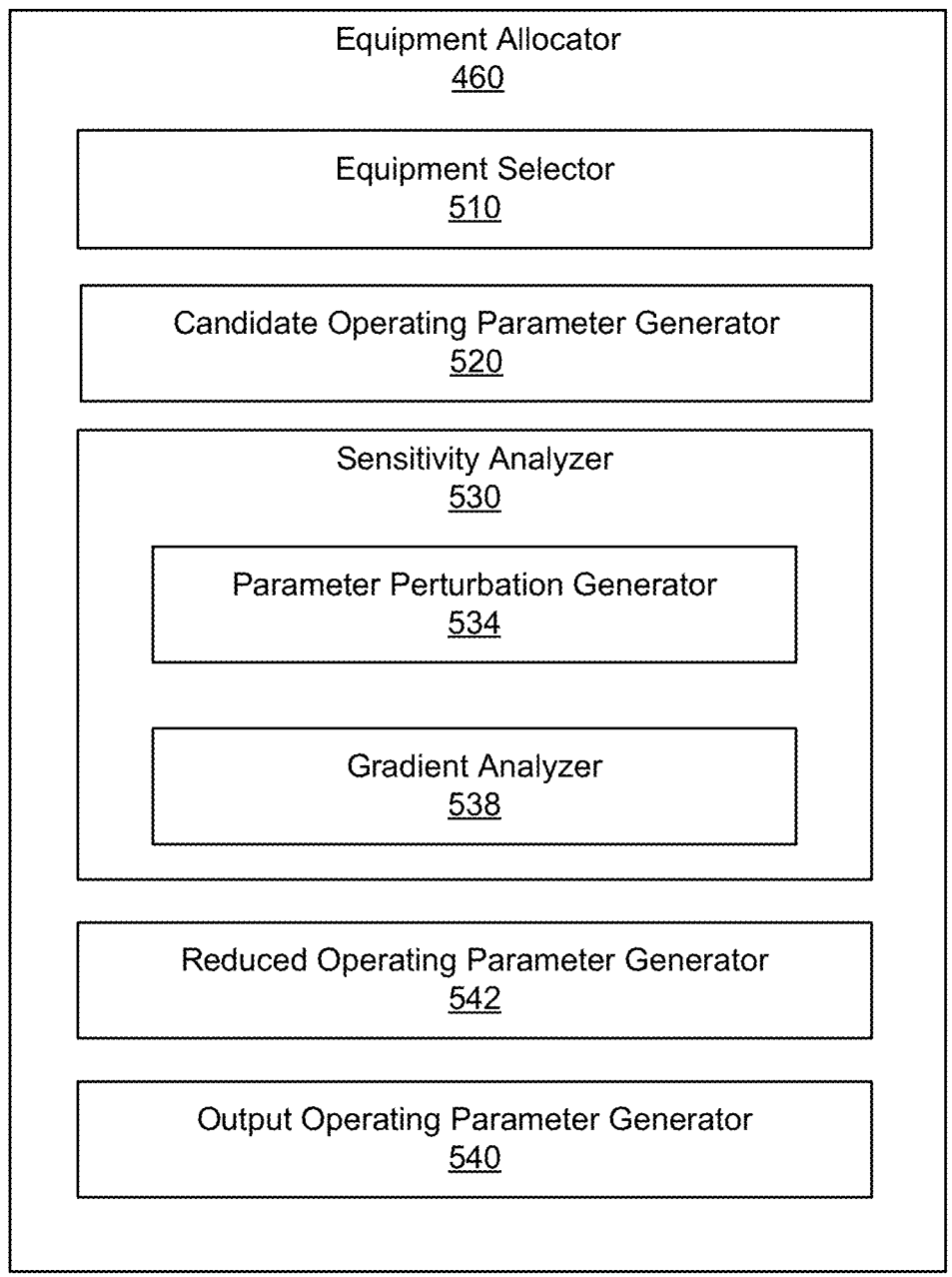
FIG. 5 is a block diagram of an equipment allocator of FIG. 4, according to some embodiments.

Referring to FIG. 5, illustrated is a block diagram of the equipment allocator 460, according to some embodiments. In one configuration, the equipment allocator 460 includes an equipment selector 510, a candidate operating parameter generator 520, a sensitivity analyzer 530, a reduced operating parameter generator 542, and an output operating parameter generator 540. These components operate together to receive the Q allocation data 442 indicating the determined thermal energy loads, determine a set of operating parameters rendering an improved performance of the HVAC system for the determined thermal energy load, and generate operating parameter and power estimation data 448 indicating the determined set of operating parameters and corresponding power consumption of the HVAC system. In some embodiments, the equipment allocator 460 includes additional, fewer, or different components than shown in FIG. 5.

The equipment selector 510 is a component that interfaces with the high level optimizer 440. In one aspect, the equipment selector 510 receives the Q allocation data 442 from the high level optimizer 440, and determines a set of operating parameters of the HVAC system according to the Q allocation data 442. In one implementation, the equipment selector 510 stores a look up table indicating a relationship between thermal energy loads and corresponding sets or ranges of operating parameters of the HVAC system. For example, the equipment selector 510 receives the Q allocation data 442 indicating a target thermal energy load of a heater and a target thermal energy load of a cooler. In this example, the equipment selector 510 may determine that a first range of the operating parameter of the heater corresponds to the target thermal energy load of the heater and a second range of the operating parameter of the heater corresponds to the target thermal energy load of the cooler based on the look up table.

The candidate operating parameter generator 520 is a component that interfaces with the state predictor 470, and generates candidate operating parameter data 462 based on the operating parameters of the HVAC system. The candidate operating parameter generator 520 may generate the candidate operating parameter data 462 based on initial operating parameters of the HVAC system determined from the equipment allocator 460. The candidate operating parameter generator 520 may generate additional candidate operating parameter data 462 according to perturbation from the sensitivity analyzer 530. In some embodiments, the candidate operating parameter generator 520 may generate the candidate operating parameter data 462 indicating a set of values of a reduced group of control variables of HVAC devices, without values of a remaining group of the control variables. The candidate operating parameter generator 520 may also cause the state predictor 470 to perform computation for predicting operating states of HVAC devices associated with the values of the reduced group of the control variables, irrespective of values of the remaining control variables of the HVAC devices. Values of the remaining control variables of the HVAC devices may be assumed to be turned off or set to a predetermined value.

The sensitivity analyzer 530 is a component that performs sensitivity analysis of values of control variables on the performance of the HVAC system. In one implementation, the sensitivity analyzer 530 includes a parameter perturbation generator 534 and a gradient analyzer 538. In this configuration, the sensitivity analyzer 530 obtains gradients of performance of the HVAC system with respect to the control variables of the HVAC system, and determines a group of control variables or a range of values of the group of control variables, to which the performance of the HVAC system is sensitive. Moreover, the sensitivity analyzer 530 determines another group of control variables or a range of values of the group of control variables, to which the performance of the HVAC system is insensitive. In one aspect, the sensitivity analyzer 530 performs sensitivity analysis prior to deployment of the HVAC system, during initialization or periodically. In some embodiments, the sensitivity analyzer 530 includes additional, fewer, or different components than shown in FIG. 5.

The parameter perturbation generator 534 is a component that adds perturbation to values of one or more control variables. In one example, the parameter perturbation generator 534 adds or subtracts a value of a control variable by a predetermined amount. Hence, the candidate operating parameter generator 520 can generate different sets of operating parameters (or different sets of values of control variables). Furthermore, predicted performances or power consumptions of the HVAC system operating according to different sets of operating parameters can be obtained.

The gradient analyzer 538 is a component that automatically analyzes sensitivities of the control variables of the HVAC devices. In one approach, the gradient analyzer 538 generates gradients data indicating gradients of the performances of the HVAC system with respect to different control variables. A gradient of performances of the HVAC system represents a sensitivity of a control variable on the performance of the HVAC system. Thus, by analyzing gradients of the performances of the HVAC system with respect to different control variables, sensitivities of different control variables on the performance of the HVAC system can be determined. Moreover, control variables or a range of values of control variables, to which the performance of the HVAC system is insensitive, may be omitted or isolated, when determining operating states of the HVAC system by the state predictor 470. In one approach, the gradient analyzer 538 automatically determines a range of values of a control variable associated with a gradient less than a predetermined threshold as being the performance of the HVAC system sensitive or insensitive to particular control variables or ranges of values of the control variables. In another approach, the gradient analyzer 538 automatically determines a value of a control variable rendering a local minimum of the performance of the HVAC system, and determines values of the performance (e.g., 10% of the local minimum) within a predetermined amount from the local minimum. The gradient analyzer 538 may determine that the performance of the HVAC system is insensitive to a range of values of the control variable rendering the determined values of the performance including the local minimum. Similarly, the gradient analyzer 538 may automatically determine a range of values of a control variable associated with a gradient larger than the predetermined threshold, and determine that the performance of the HVAC system is sensitive to the determined range of values of the control variable. In one aspect, gradient analyzer 538 stores ranges of values of control variables, to which the performance of the HVAC system is insensitive, and ranges of values of control variables, to which the performance of the HVAC system is sensitive.

The reduced operating parameter generator 542 is a component that obtains a reduced group of control variables. The reduced operating parameter generator 542 may receive a set of operating parameters from the HVAC system from the equipment selector 510, and omit or remove one or more control variables, to which the performance of the HVAC system is insensitive. The reduced operating parameter generator 542 may refer to the look up table from the gradient analyzer 538, and remove a control variable having a value within a range of values of the control variable, to which the performance of the HVAC system is insensitive, as indicated by the look up table. The reduced operating parameter generator 542 may generate the candidate operating parameter data 462 indicating the reduced group of control variables, and provide the candidate operating parameter data 462 to the state predictor 470.

The output operating parameter generator 540 is a component that determines a set of values of control variables for operating the HVAC system, and provides the operating parameter and power estimation data 448 indicating the determined set of values of the control variables and predicted power consumption. In one example, the output operating parameter generator 540 determines, from different sets of values of control variables, the set of values of control variables rendering the lowest power consumption. The output operating parameter generator 540 may generate the operating parameter and power estimation data 448 including a set of values of reduced group of control variables that are sensitive to the operating performance and predetermined values (e.g., local minima) of the other group of control variables that are insensitive to the operating performance. The output operating parameter generator 540 may add predetermined values (e.g., local minima) of omitted control variables in the operating parameter and power estimation data 448.

In one aspect, the sensitivity analyzer 530 performs sensitivity analysis prior to deployment of the HVAC system, during initialization, periodically, in response to detecting a change in topology of the HVAC system, or any combination of them. During operation of the energy plant, the reduced operating parameter generator 542 may utilize the result from the sensitivity analysis to reduce a number of states of values of control variables to be predicted by the state predictor 470. Hence, the amount of computation performed by the state predictor 470 may be conserved.

Figure 6:
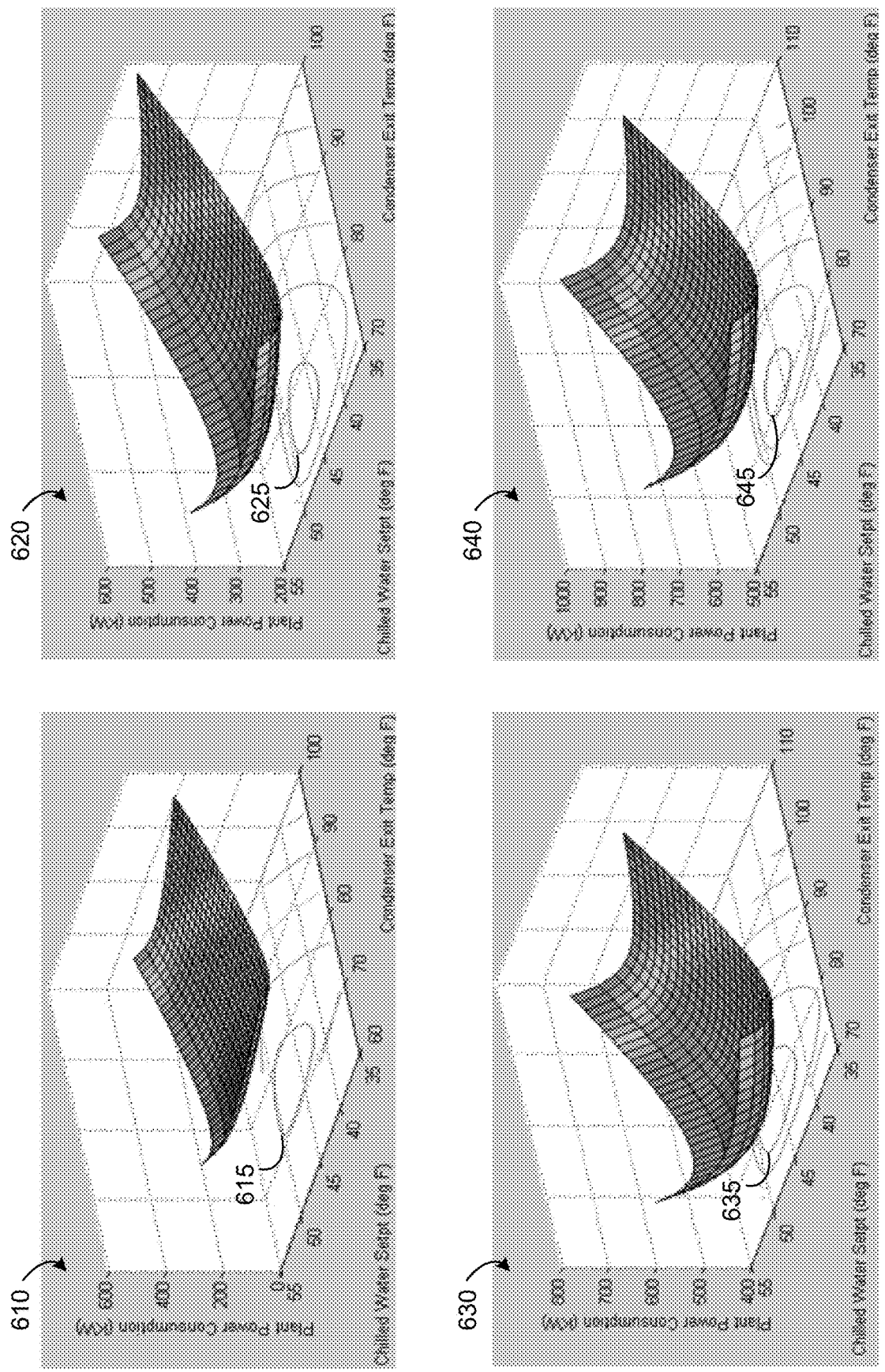
FIG. 6 illustrates various power consumption plots of the HVAC system, according to some embodiments.

FIG. 6 illustrates various power consumption plots 610, 620, 630, 640 of the HVAC system, according to some embodiments. Under different operating parameters or operating states, power consumptions may vary as shown in the plots 610, 620, 630, 640. Moreover, gradients of the plots 610, 620, 630, 640 may be obtained to determine an isolated region of values of control variables. For example, flatter regions 615, 625, 635, 645 of the plots 610, 620, 630, 640 may indicate that the power consumption of the HVAC system may be insensitive to ranges of values of control variables corresponding to the flatter regions. A range of values of control variables with a gradient less than a predetermined threshold may be automatically determined, and such control variables or range of values of control variables may be omitted or isolated when predicting operating state of the HVAC system or determining power consumption of the HVAC system.

In some embodiments, some components of the equipment allocator 460 may be performed by a non-linear optimizer (e.g., sequential quadratic programming optimizer). The non-linear optimizer may be configured to obtain gradients of the power consumption plots 610, 620, 630, 640 and determine local minima 615, 625, 635, 645 corresponding to the lowest power consumption for a given range of control variables. The equipment allocator 460 may utilize gradients obtained from the non-linear optimizer to reduce computational resource.

Figure 7:
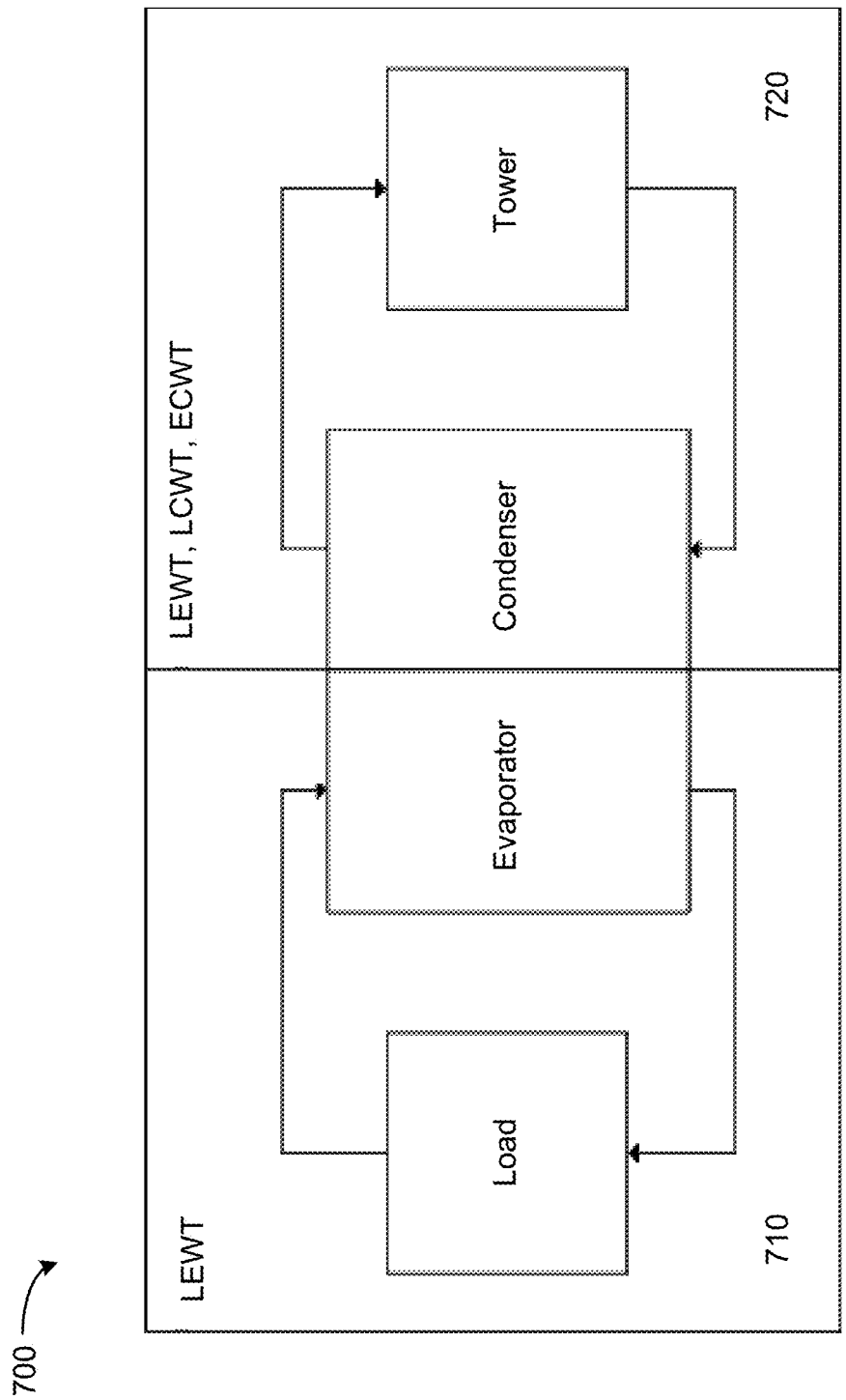
FIG. 7 is an example schematic representation of HVAC system, according to some embodiments.

Referring to FIG. 7, illustrated is an example schematic representation of HVAC system 700, according to some embodiments. The example HVAC system 700 includes a first set 710 of HVAC devices and a second set 720 of HVAC devices. Based on the sensitivity analysis by automatically analyzing gradients, the low level optimizer 450 of FIG. 4 may determine that the performance of the first set 710 of HVAC devices are sensitive to leaving evaporator water temperature (LEWT) control variables but insensitive to the leaving condenser water temperature (LCWT), entering condenser water temperature (ECWT) control variables. Similarly, the low level optimizer 450 of FIG. 4 may determine that the performance of the second set 720 of HVAC devices are sensitive to LEWT, LCWT, ECWT control variables. Assuming that the LEWT control variable is modified or updated, the low level optimizer 450 may predict operating states of the second set 720 of HVAC devices irrespective of the operating states of the first set 710 of the HVAC devices.

Figure 8:
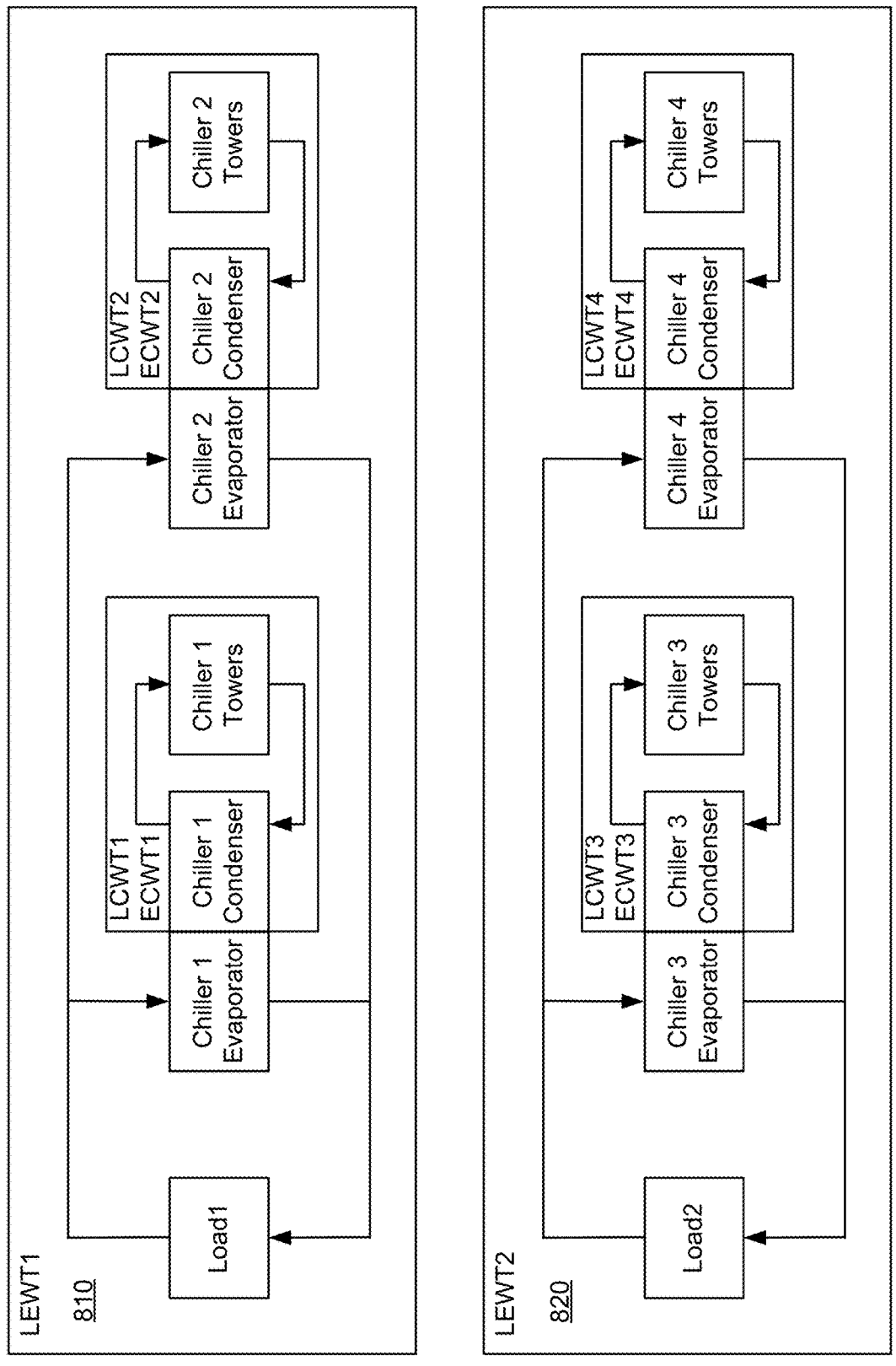
FIG. 8 is another example schematic representation of HVAC system, according to some embodiments.

Referring to FIG. 8, illustrated is another example schematic representation of HVAC system 800, according to some embodiments. The example HVAC system 800 includes two separate feedback loops 810, 820 operating with independent control variables. The low level optimizer 450 of FIG. 4 may determine that the feedback loops 810, 820 are independent from each other through the sensitivity analysis by automatically analyzing gradients as disclosed herein. Thus, the low level optimizer 450 may predict operating states of the first feedback loop 810 irrespective of the second feedback loop 820. Similarly, the low level optimizer 450 may predict operating states of the second feedback loop 820 irrespective of the first feedback loop 810.

Figure 9:
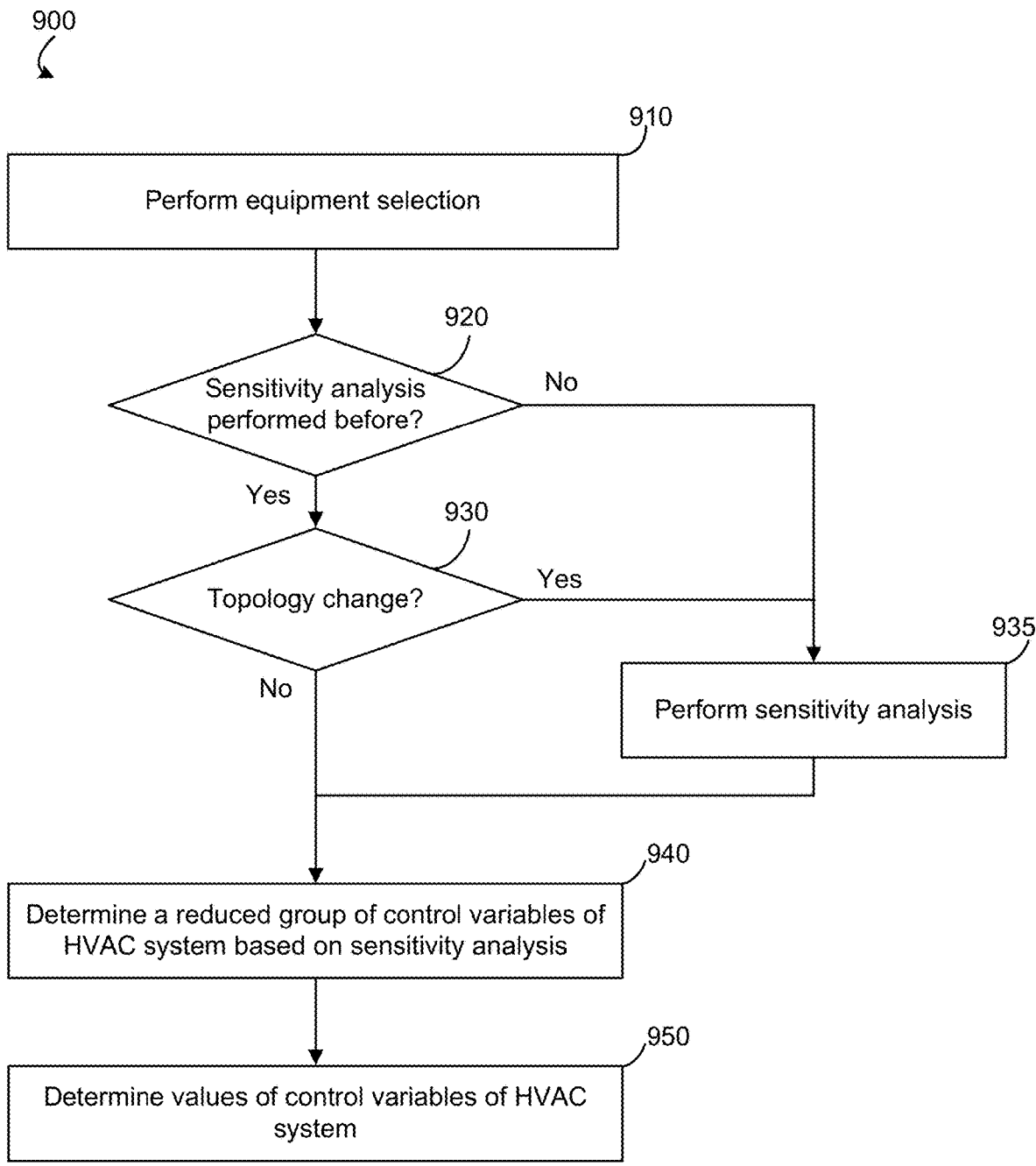
FIG. 9 is a flow chart illustrating a process for determining operating parameters of the HVAC system through computation reduction based on sensitivity analysis, according to some embodiments.

Referring to FIG. 9, illustrated is a flow chart illustrating a process 900 for determining operating parameters of the HVAC system through computation reduction based on sensitivity analysis, according to some embodiments. The process 900 may be performed by the low level optimizer 450 of FIG. 4. In some embodiments, the process 900 may be performed by other entities. In some embodiments, the process 900 may include additional, fewer, or different steps than shown in FIG. 9.

The low level optimizer 450 performs equipment selection (step 910). For example, the equipment selector 510 receives the Q allocation data 442 and determines control variables of one or more HVAC devices according to the Q allocation data 442. In one example, the Q allocation data 442 specifies a load of a HVAC device, and the low level optimizer 450 determines control variables of the HVAC device.

The low level optimizer 450 determines whether sensitivity analysis has been performed before (step 920). If the sensitivity analysis has been performed already, the low level optimizer 450 determines whether a topology or a schematic configuration of the HVAC system has been changed (step 930). The low level optimizer 450 determines a reduced group of control variables of the HVAC system based on sensitivity analysis performed (step 940). For example, the low level optimizer 450 identifies a range of values of control variables sensitive to power consumption or other operating performances of the HVAC system. Responsive to determining that the sensitivity analysis has been already performed and the topology of the HVAC system has not been changed, the low level optimizer 450 may rely on the sensitivity analysis performed previously to determine the reduced group of control variables of the HVAC system. Responsive to determining that the sensitivity analysis has not been performed or determining that the topology of the HVAC system has been updated, the low level optimizer 450 perform a new sensitivity analysis (step 935). The low level optimizer 450 may rely on the sensitivity analysis performed in step 935 to determine the reduced group of control variables of the HVAC system. Hence, the low level optimizer 450 may not perform sensitivity analysis every time when determining the operating parameters of the HVAC system.

The low level optimizer 450 may predict operating states of HVAC devices of the HVAC system according to the reduced group of the control variables that are sensitive to power consumption of the HVAC system. The low level optimizer 450 may exclude or isolate predicting operating states of other control variables insensitive to the power consumption of the HVAC system. For each set of values of the reduced group of control variables, the low level optimizer 450 may predict a corresponding operating performance (e.g., power consumption) of the HVAC system.

The low level optimizer 450 may determine a set of values of control variables of the HVAC system by comparing predicted operating performances of the HVAC system operating according to different sets of values of the control variables (step 950). For example, the low level optimizer 450 may determine a set of values of control variables of the HVAC system rendering lower power consumptions than other sets of values of the control variables. The low level optimizer 450 generates the operating parameter and power estimation data 448 indicating the determined set of values of control variables and predicted power consumption of the HVAC system, and provides the operating parameter and power estimation data 448 to the high level optimizer 440. Based on the operating parameter and power estimation data 448, the HVAC system may operate according to the determined operating parameters.

Advantageously, by omitting or isolating control variables of HVAC devices insensitive to the power consumption of the HVAC system according to disclosed sensitivity analysis, a number of unknowns to be solved can be reduced. Hence, computation resource for predicting operating states of HVAC system and predicting operating performance can be conserved. For example, determining values of control variables of the HVAC system through a conventional approach may take several hours, whereas determining values of control variables of the HVAC system through a disclosed approach may take less than 15 minutes.

Figure 10:
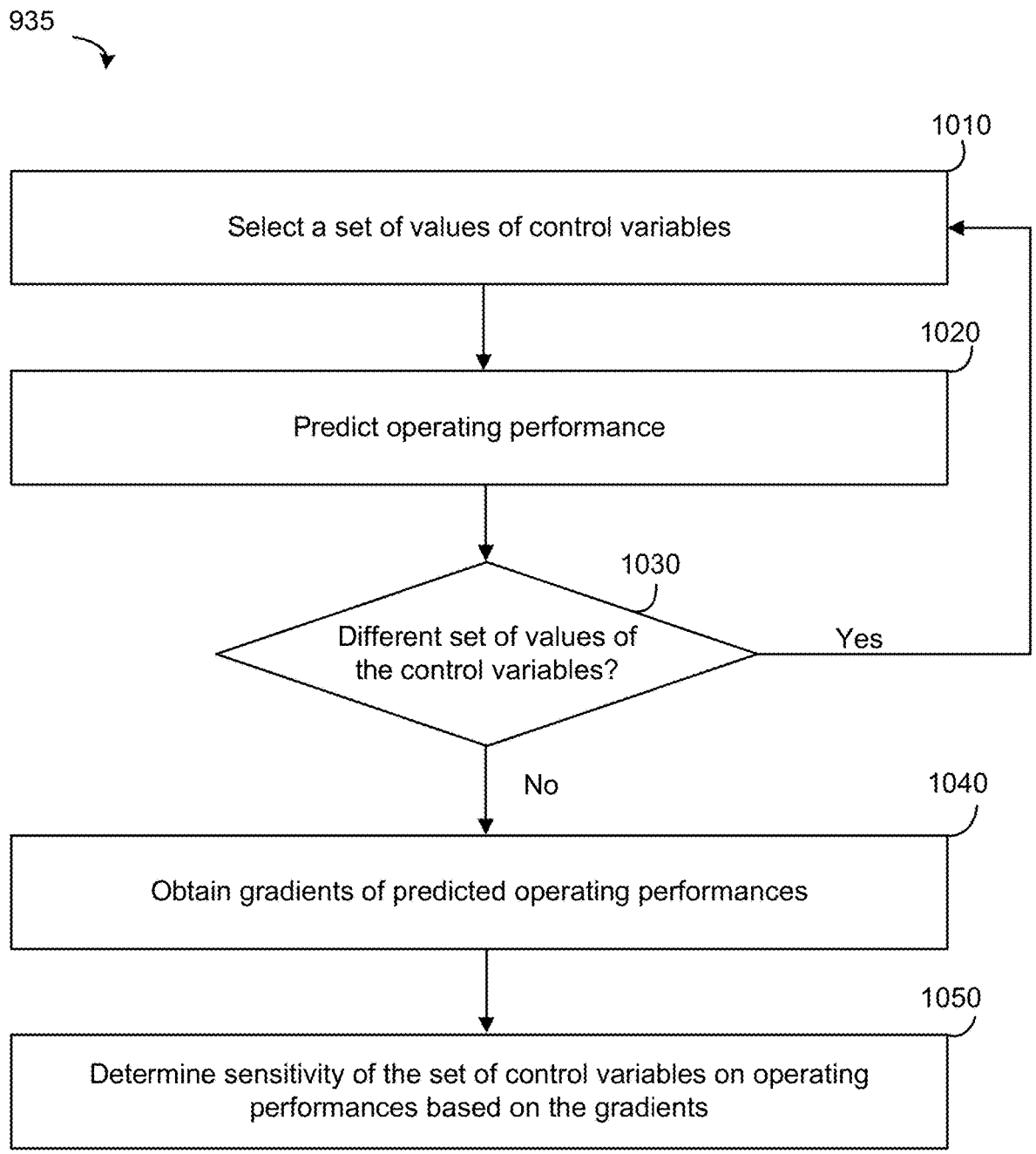
FIG. 10 is a flow chart illustrating a process for performing sensitivity analysis, according to some embodiments.

Referring to FIG. 10, illustrated is a flow chart illustrating a process 900 for performing sensitivity analysis, according to some embodiments. The process 900 may be performed by the low level optimizer 450 of FIG. 4. In some embodiments, the process 900 may be performed by other entities. In some embodiments, the process 900 may include additional, fewer, or different steps than shown in FIG. 10.

The low level optimizer 450 selects a set of operating parameters (step 1010). The low level optimizer 450 predicts operating performance (e.g., power consumption) of the HVAC system operating according to the selected set of operating parameters (step 1020). Moreover, the low level optimizer 450 determines if a different set of values of control variables is available (step 1030). The different set of operating parameters may include one or more values perturbed from the set of values of the control variables. For example, the set of values of the control variables includes "70% chiller capacity, 25 F inlet temperature and 45 F outlet temperature" and a different set of values of the control variables includes "75% chiller capacity, 25 F inlet temperature and 45 F outlet temperature." Responsive to determining that a different set of values of control parameters is available, the low level optimizer 450 selects the different set of values of control parameters, and predicts operating performance of the HVAC system operating according to the different set of values of the control variables.

Responsive to determining that no additional set of values of control variables is available (or all operating performances of the HVAC system for different sets of values of control variables is obtained), the low level optimizer 450 obtains gradients of the operating performance (step 1040). Moreover, the low level optimizer 450 determines sensitivity of the control variables on the operating performance based on the gradients (step 1050). For example, the low level optimizer 450 may determine that a group of the control variables or a range of values of the control variables is sensitive to the operating performance of the HVAC system, responsive to determining that magnitudes of the gradients of the operating performance (e.g., power consumption) with respect to the group of the control variables or the range of values of the group of the control variables being higher than a predetermined threshold. Similarly, the low level optimizer 450 determines that another group of control variables or a range of values of the other group of control variables is insensitive to the operating performance of the HVAC system, responsive to determining that magnitudes of the gradients of the performance with respect to the other group of control variables or the range of values of the control variables being less than the predetermined threshold. Additionally or alternatively, the low level optimizer 450 determines that another group of control variables or a range of values of the other group of control variables is insensitive to the operating performance of the HVAC system, responsive to determining that the range of values of the other group of control variables renders values of operating performance of the energy plant within a predetermined amount from a local minima.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an energy plant having heating, ventilation, and air conditioning (HVAC) devices, the controller comprising:
a processing circuit comprising a processor and memory storing instructions executed by the processor, the processing circuit configured to:
generate gradient data indicating a gradient of operating performance of the energy plant with respect to values of a plurality of control variables of the HVAC devices;
determine, from the plurality of control variables, a reduced group of control variables of the HVAC devices based on the gradient data;
determine a set of values of the reduced group of control variables; and
operate the HVAC devices of the energy plant according to the determined set of values of the reduced group of control variables.

2. The controller of claim 1, wherein the control variables include at least a capacity, temperature, or pressure of one or more of the HVAC devices.

3. The controller of claim 1, wherein the processing circuit is configured to determine the reduced group of control variables by:
determining a range of values of a control variable, to which the operating performance of the energy plant is insensitive; and
excluding the control variable from the plurality of control variables to obtain the reduced group of control variables.

4. The controller of claim 3, wherein the processing circuit is configured to:
operate the energy plant according to a predetermined value of the excluded control variable.

5. The controller of claim 3, wherein the processing circuit is configured to:
determine a local minimum of the operating performance of the energy plant,
determine a range of values of the operating performance of the energy plant, the range of values of the operating performance within a predetermined amount from the local minimum, and
determine the range of values of the control variable corresponding to the range of values of the operating performance.

6. The controller of claim 3, wherein the processing circuit is configured to:
determine the range of values of the control variable rendering the gradient below a threshold.

7. The controller of claim 1, wherein the processing circuit is configured to determine the set of values of the reduced group of control variables by: predicting states of the HVAC devices using a non-linear optimizer.

8. The controller of claim 7, wherein the processing circuit is configured to determine the set of values of the reduced group of control variables by:
excluding one or more control variables to which the operating performance of the energy plant is insensitive from predicting the states of the HVAC devices using the non-linear optimizer.

9. The controller of claim 1, wherein the processing circuit is configured to:
generate the gradient data in response to detecting a change in a topology of the HVAC devices.

10. A method of operating an energy plant having heating, ventilation, and air conditioning (HVAC) devices, the method comprising:
generating gradient data indicating a gradient of operating performance of the energy plant with respect to values of a plurality of control variables of the HVAC devices;
determining, from the plurality of control variables, a reduced group of control variables of the HVAC devices based on the gradient data;
determining a set of values of the reduced group of control variables; and
operating the HVAC devices of the energy plant according to the determined set of values of the reduced group of control variables.

11. The method of claim 10, wherein the control variables include at least a capacity, temperature, or pressure of one or more of the HVAC devices.

12. The method of claim 10, wherein determining the reduced group of control variables includes:
determining a range of values of a control variable, to which the operating performance of the energy plant is insensitive; and
excluding the control variable from the plurality of control variables to obtain the reduced group of control variables.

13. The method of claim 12, further comprising:
operating the energy plant according to a predetermined value of the excluded control variable.

14. The method of claim 12, further comprising:
determining a local minimum of the operating performance of the energy plant,
determining a range of values of the operating performance of the energy plant, the range of values of the operating performance within a predetermined amount from the local minimum, and
determining the range of values of the control variable corresponding to the range of values of the operating performance.

15. The method of claim 12, further comprising:
determining the range of values of the control variable rendering the gradient below a threshold.

16. The method of claim 10, further comprising:
predicting states of the HVAC devices using a non-linear optimizer.

17. The method of claim 16, further comprising:
excluding one or more control variables, to which the operating performance of the energy plant is insensitive from predicting the states of the HVAC devices using the non-linear optimizer.

18. The method of claim 10, further comprising:
generating the gradient data in response to detecting a change in a topology of the HVAC devices.

19. A non-transitory computer readable medium comprising instructions when executed by a processor cause the processor to:
detect a change in a topology of a plurality of heating, ventilation, and air conditioning (HVAC) devices of an energy plant;
determine, from a plurality of control variables of the plurality of HVAC devices, a reduced group of control variables of the plurality of HVAC devices, in response to detecting the change in the topology of the plurality of HVAC devices;
determine a set of values of the reduced group of control variables; and
operate the plurality of HVAC devices the energy plant according to the determined set of values of the reduced group of control variables.

20. The non-transitory computer readable medium of claim 19, wherein the instructions when executed by the processor further cause the processor to:
generate gradient data indicating a gradient of operating performance of the energy plant with respect to values of the plurality of HVAC devices, in response to detecting the change in the topology of the plurality of HVAC devices,
wherein the reduced group of control variables are determined based on the gradient data.

* * * * *